Figure 1:
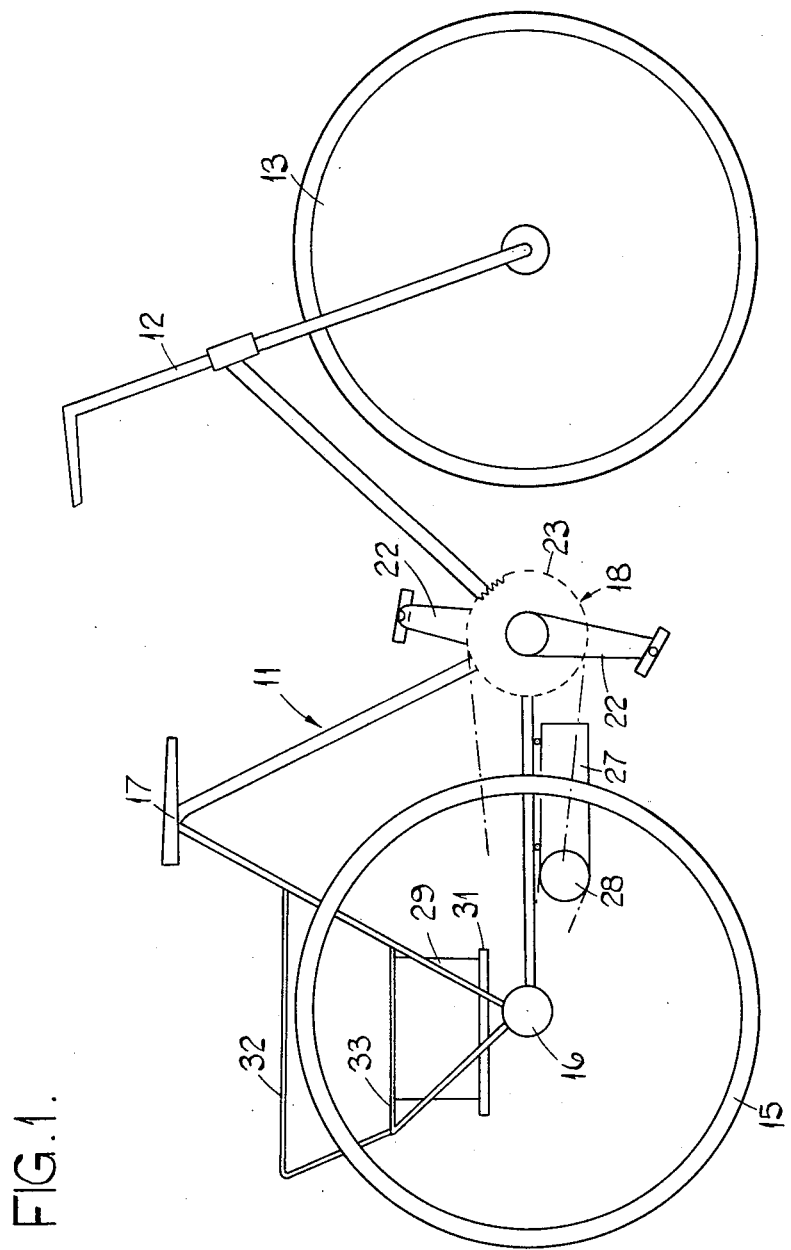

United States Patent [19]

Davidson et al.

[11] 4,122,907
[45] Oct. 31, 1978

[54] ELECTRICALLY ASSISTED CYCLES

[75] Inventors: Charles P. D. Davidson, Droitwich; Edward G. Philips, Colne, both of England

[73] Assignee: Lucas Industries Limited, Birmingham, England

[21] Appl. No.: 805,131

[22] Filed: Jun. 9, 1977

[30] Foreign Application Priority Data

Jun. 11, 1976 [GB] United Kingdom ............... 24244/76

[51] Int. Cl.² ............................................. B62M 7/00
[52] U.S. Cl. ................................... 180/33 C; 180/34; 280/214
[58] Field of Search ..................... 180/33 C, 33 D, 34, 180/65 A

[56] References Cited

U.S. PATENT DOCUMENTS

| 3,773,131 | 11/1973 | Jaulmes | 180/33 C |
|---|---|---|---|
| 3,884,317 | 5/1975 | Kinzel | 180/34 |
| 3,991,843 | 11/1976 | Davidson | 180/33 C |

FOREIGN PATENT DOCUMENTS 443,948  2/1968  Switzerland ........................... 180/33 C Primary Examiner—Joseph F. Peters, Jr.
Assistant Examiner—Donn McGiehan
Attorney, Agent, or Firm—Holman & Stern

[57] ABSTRACT

An electrically assisted cycle, particularly but not exclusively a pedal bicycle or tricycle, wherein there is provided an electric motor which can assist the rider in propelling the cycle, the frame of the cycle supporting batteries for powering the motor. In order that the rider can only obtain electrical assistance there is provided a sensing arrangement for sensing the speed at which the chain wheel of the pedal assembly of the cycle is being rotated. The sensing means controls operation of an electrical switch in turn controlling energization of the motor. Thus, in order for the motor to be energized the rider must be rotating the pedals at a speed in excess of a predetermined speed.

4 Claims, 7 Drawing Figures

ELECTRICALLY ASSISTED CYCLES

This invention relates to electrically assisted cycles, particularly but not exclusively pedal bicycles and tricycles.

A cycle according to the invention includes a frame rotatably supporting a ground engaging wheel, rider operable drive means rotatably mounted on the frame and coupled to said wheel whereby the rider can rotate said drive means to propel the cycle, an electric motor and an associated power source carried by said frame, the output of said electric motor being coupled to said wheel whereby said motor can assist propulsion of the cycle, electrical switch means operable to permit energisation of said motor and sensing means sensing the speed of rotation of said rider operable drive means or of a component which moves therewith, said sensing means causing operation of said switch means only when the speed of rotation of said drive means exceeds a predetermined speed whereby in order to obtain electrical assistance in propelling the cycle the rider must rotate said drive means at a speed in excess of said predetermined speed.

Preferably said rider operable drive means includes a pair of pedals connected to a chain wheel, rotation of the chain wheel being transmitted to said ground engaging wheel, and said sensing means having a delay facility whereby said switch means, when operative is not returned to its inoperative state immediately the speed of rotation of said drive means falls below said predetermined speed so that the electric motor is not de-energised during for example, the very short periods where the cycle pedals are around the top and bottom dead centre of their movements where inherently as a result of the normal pedalling action the speed of rotation may momentarily fall below the predetermined value.

Conveniently, the sensing means comprises a part or parts carried by the chain wheel of the drive means and a sensing head carried by the frame and positioned adjacent the path of movement of said part carried by the chain wheel.

Desirably the chain wheel carries a plurality of equi-angularly spaced permanent magnets disposed in a circular row having its centre on the axis of rotation of the chain wheel and said sensing head is arranged to produce output signals resulting from the passage adjacent the head of the magnets, said signals being utilized to control operation of said switch means.

Figure 2:
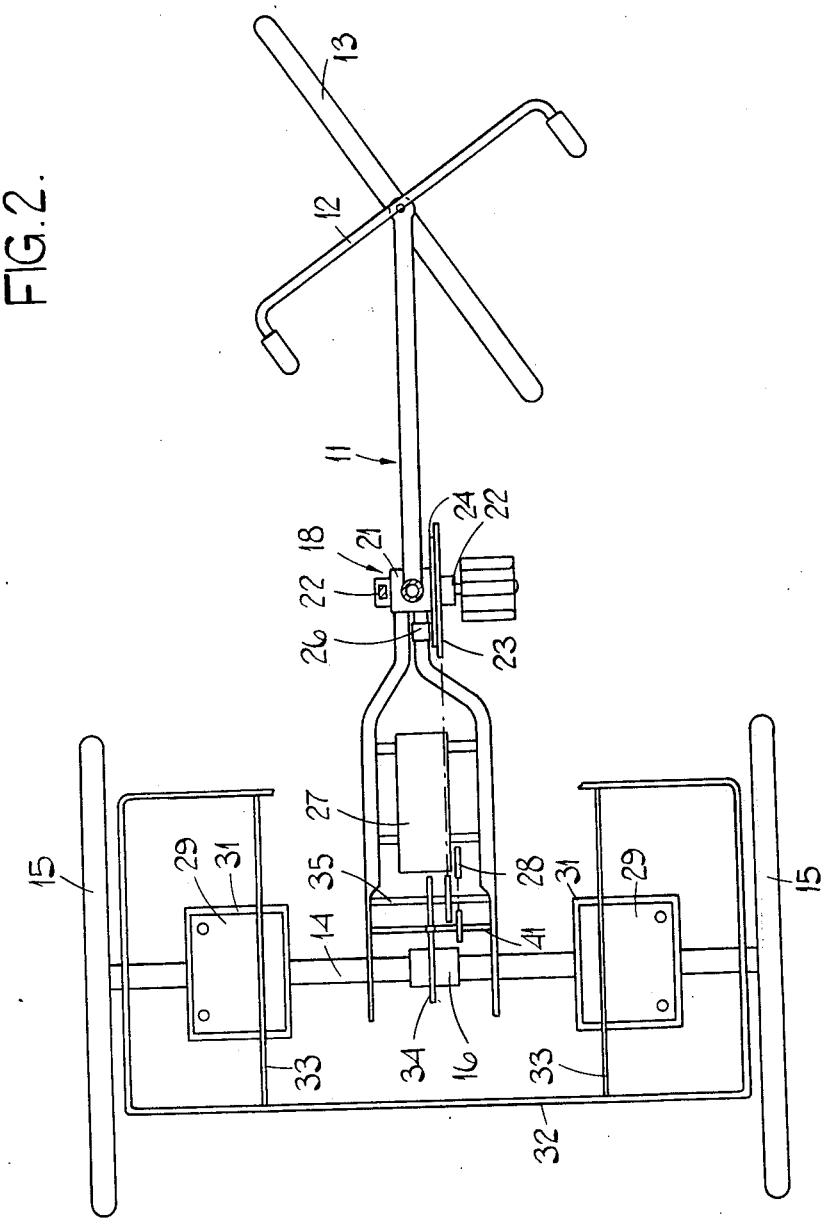
Figure 3:
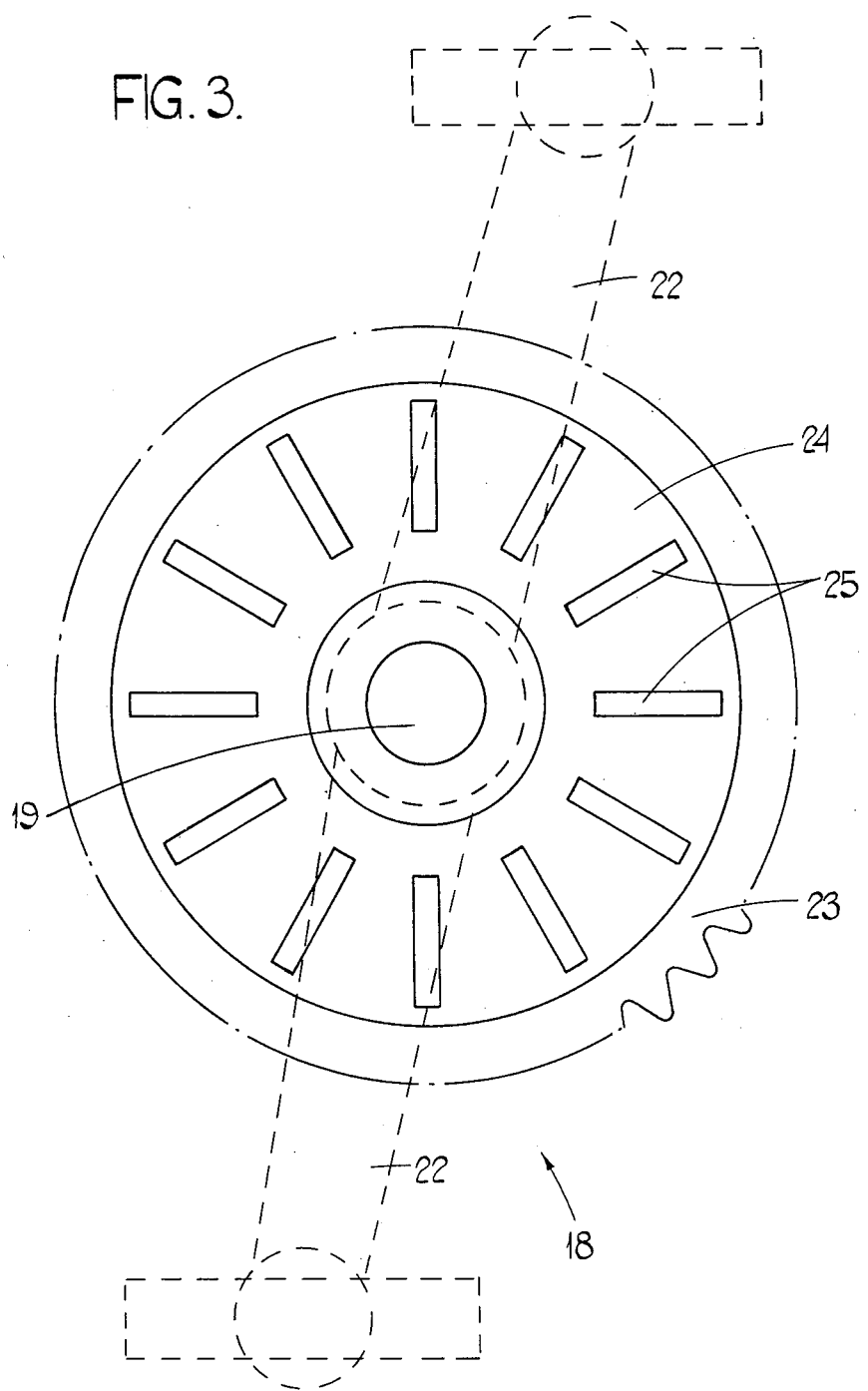
Figure 4:
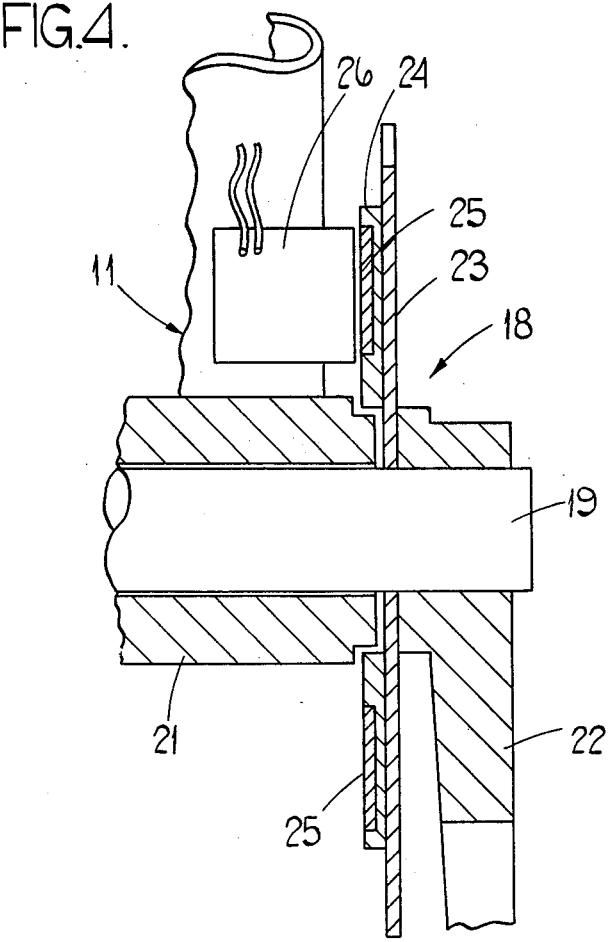
Figure 5:
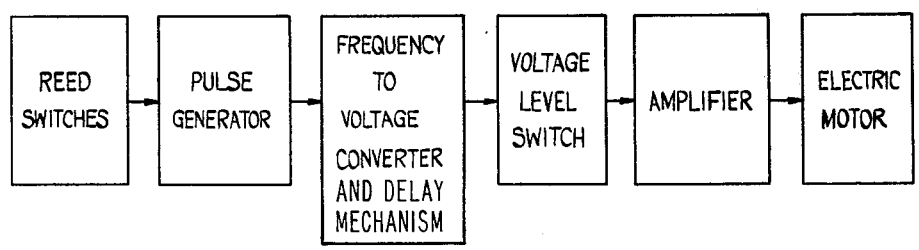
Figure 6:
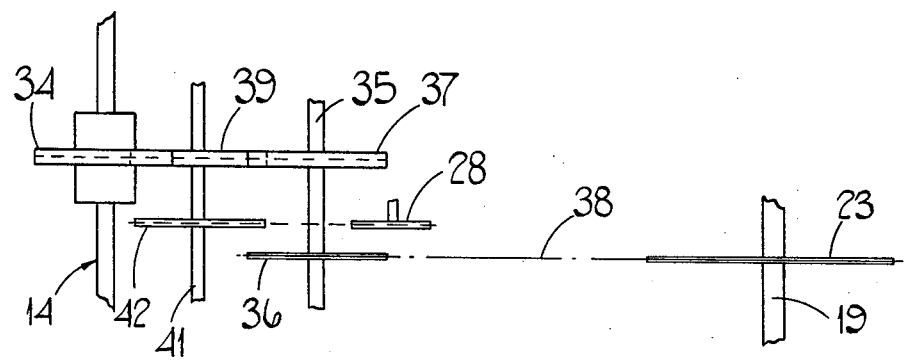
Figure 7:
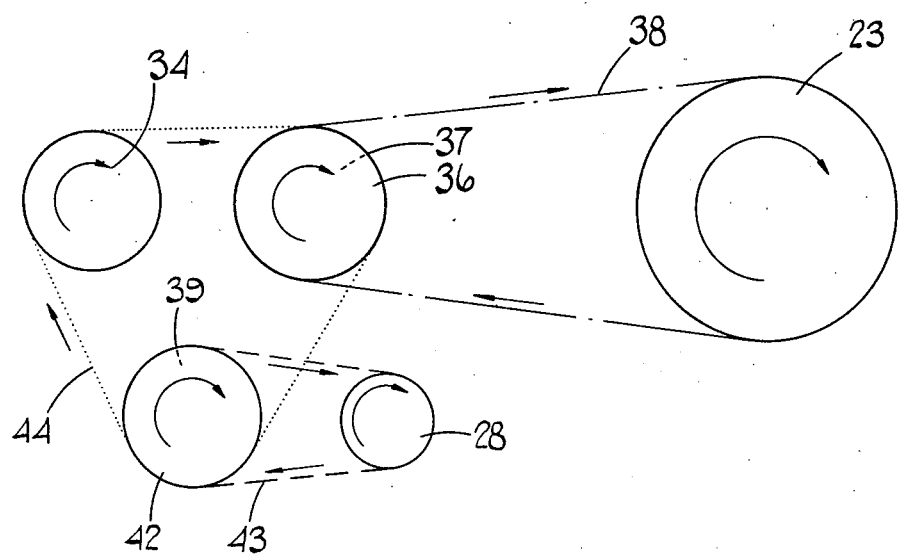

One example of the invention is illustrated in the accompanying drawings, wherein:

FIG. 1 is a diagrammatic side elevational view of a pedal tricycle,

FIG. 2 is a plan view of the tricycle shown in FIG. 1 with parts thereof omitted for clarity, FIG. 3 is an enlarged diagrammatic representation of part of the pedal assembly of the tricycle shown in FIGS. 1 and 2, FIG. 4 is a sectional view of part of the pedal assembly also to an enlarged scale, FIG. 5 is a block diagram illustrating an electronic control circuit of the electric motor of the cycle, FIG. 6 is a diagrammatic representation of the mechanical drive arrangement of the cycle, and FIG. 7 is a side elevational representation of the arrangement shown in FIG. 6. Referring to the drawings, the tricycle includes a main structural frame 11 formed in the usual manner from metal tube. At one end of the frame there is provided a pivotable handle bar assembly 12 carrying at its lower end a steerable ground engaging wheel 13. Extending transversely of the frame 11 at its end remote from the wheel 13 is a rear axle assembly 14. At each end of the rear axle assembly 14 is a ground engaging wheel 15 the wheels 15 each being connected to respective half-shafts of the axle assembly 14. At their innermost ends the half-shafts are connected in a differential gear mechanism 16 whereby both wheels 15 can be driven, and whereby one of the wheels can overrun the other during cornering.

The frame 11 carries a saddle 17 and intermediate the assembly 14 and the wheel 13 the frame 11 supports a pedal assembly 18. The pedal assembly 18 comprises a short shaft 19 which extends transversely of the frame and is received in a bearing bush 21 of the frame. The shaft 19 extends at both ends from the bush 21 and secured to each end of the shaft 19 is a pedal crank arm 22, the arms 22 being, as usual, angularly displaced from one another by 180° around the axis of the shaft 19. Each of the arms 12 at its free end carries a pedal platform in the normal manner. Rigidly secured to one of the arms 22 and having its axis coincident with the axis of the shaft 19 is a toothed chain wheel 23. The chain wheel 23 thus lies in a plane parallel to the longitudinal plane of the frame 11.

Bolted to the innermost face of the wheel 23 is an aluminium annulus 24 carrying twelve equi-angularly spaced and radially extending ferrite magnets 25. Secured to the frame 11 adjacent the annulus 24 is a pick-up head 26 which incorporates first and second reed switches spaced apart angularly with respect to the axis of the shaft 19. The reed switches are positioned close to the annulus 24 so that as the wheel 23 rotates relative to the head 26 the magnets 25, each in turn, pass closely adjacent the reed switches. Each magnet passes each reed switch in turn by virtue of the angular spacing of the reed switches. The reed switches are conveniently normally open reed switches and are closed momentarily by the close proximity of one of the ferrite magnets 25. Thus as the wheel 23 rotates the reed switches are each closed, and then open again 12 times during one revolution of the wheel 23.

An electric motor and gear-box unit 27 is carried by the frame 11, the unit being slung beneath the frame between the pedal assembly 18 and the axle assembly 14. The unit 27 is elongate and is positioned aligned with the frame 11, the output of the unit being a pinion gear 28 rotatable about an axis extending transverse to the frame 11. The power source for the electric motor of the units 27 is a pair of 12 volt electric storage batteries 29. The batteries 29 are disposed on opposite sides of the tricycle and their weight is carried by the axle assembly 14. Secured to the axle assembly 14 are a pair of shallow trays 31 in which the batteries 29 respectively stand. The batteries 29 are held against vertical movement relative to their face 31 by elongate members 33 of the subframe 32 of a load carrier. The load carrier comprises the frame 32 which is bolted to the main frame of the cycle and a basket which is supported by the frame 32 and is readily detachable therefrom. The members 33 are formed of metal tube, and are externally coated with a synthetic resin layer and engage the top surfaces of their respective batteries 29. The synthetic resin layer on the members 33 minimises the risk of shorting of the batteries by the respective members 33 and also reduces the possibility of corrosion of the members 33 for example as a result of the acid film which can build up on the top surface of a battery in use. Preferably, the batteries chosen will have a groove in their top cover which receives the respective member 33 so that in addition to locating the batteries against vertical movement relative to their respective trays the members 33 also locate the batteries transversly. The low walls of the trays 31 also locate the batteries transversly and longitudinally.

The differential gear mechanism 16 has its input member defined by a sleeve carrying a pinion gear 34. The pinion gear 34 is aligned on the longitudinal central plane of the frame 11 and thus although parallel to the chain wheel 23 is nevertheless transversely spaced therefrom. In order that drive from the chain wheel 23 can be transmitted to the pinion 34, there is provided a lay shaft 35 journalled for rotation in the frame 11 and extending parallel to the axis of the assembly 14. The lay shaft 35 carries a first pinion gear 36 and a second pinion gear 37, the pinion gear 36 being aligned with and coupled to the chain wheel 23. A conventional non-extensible flexible roller chain 38 links the chain wheel 23 and the pinion 36. The pinion 37 is aligned with the pinion 34 of the differential gear mechanism as is a pinion gear 39 carried by an idler shaft 41. The idler shaft 41 is parallel to the assembly 14 and shaft 35, but lies in a plane vertically below a plane passing through the assembly 14 and shaft 35. The idler shaft 41 is also journalled for rotation in the frame 11 and carries a second pinion gear 42 aligned with the gear 28 defining the output of the motor and gear-box unit 27. The roller chain 38 is indicated in FIGS. 6 and 7 by a chain dotted line. A second roller chain 43 indicated in FIGS. 6 and 7 by a broken line extends around and couples the pinion gear 28 and 42, and a third roller chain 44 indicated in FIGS. 6 and 7 by a dotted line extends around and couples the pinion gears 34, 37, 39. A free-wheel connection is provided either between the shaft 35 and the pinion 37 or between the shaft 35 and the pinion 36 so that the differential gear mechanism can continue to rotate while the pedals are stationary. Similarly a free wheel mechanism is incorporated either between the shaft 41 and the pinion 42, the shaft 42 and the pinion 39, or in the output of the unit 27 so that the cycle can overrun the motor and gearbox unit for example, when travelling rapidly downhill or when the electric motor is not energised, so that the rider of the cycle does not need to overcome the resistance to rotation of the gear train of the gearbox fo the units 27.

It will be understood that when the rider is pedalling, that is to say when the rider is rotating the chain wheel 23 by means of the pedals in a forward direction, then the rotation of the chain wheel 23 is transmitted to the shaft 35 by way of the pinion 36 and is in turn transmitted to the input 34 of the differential gear mechanism by way of the pinion 37 and the chain 44. Similarly, when the motor and gearbox unit 37 is operative the rotation of the pinion 28 is transmitted to the differential gear input 34 by way of the chain 43, the pinion 42, the shaft 41, the pinion 39, and the chain 44.

Energisation of the electric motor of the unit 27 is controlled by a manually operable switch (not shown) carried on the handle bars 12 of the tricycle. The manually operable switch is a normally open switch and is held closed to permit energisation of the motor by the rider. Thus immediately the rider releases the switch then the motor will be de-energised. In practice, the manually operable switch will not carry the relatively high electrical current flowing in the motor, and will serve to control operation of a heavy current relay which directly controls the motor current.

It will be understood that in the absence of any other control the motor unit 27 could be utilised to start the cycle from rest and to be the sole propulsion means of the cycle. Thus the rider would not need to pedal the cycle. This is extremely undesirable for a number of reasons, and in particular starting from rest imposes an extremely heavy drain on the batteries. Thus in order that the motor unit 27 cannot be energised unless the rider is also pedalling the cycle, and moreover is pedalling at a speed in excess of a predetermined speed there is provided an electronic control which controls operation of a switch in series with the manually operable control switch and the operating windling of the heavy current relay. Closure of both switches is required in order for the relay to operate so that the motor can be energised. The electronic control is shown in its basic essentials in FIG. 5, and incorporates the magnets 25 and pickup head 26.

The opening and closing of the first and second reed switches controls operation of a pulse generator the output signal of which is in the form of a train of square wave pulses. The square wave pulses are of equal width, but the spacing of the pulses in the train is dependent upon the speed at which the first and second reed switches are opened and closed, that is to say the speed rotation of the wheel 23. Moreover, the pulse generator is so designed that it can discriminate between the two possible directions of rotation of the wheel 23. The reed switches are angularly close to one another, and the output is only produced by the pulse generator when the first reed switch is closed immediately prior to the second reed switch as will be the case with forward rotation of the wheel 23. In the event that the second reed switch is closed immediately prior to the first reed switch as will be the case with reverse rotation of the wheel 23 then the pulse generator does not produce its output.

From the foregoing paragraph it will be understood that upon rotation of the wheel 23 in the forward direction, then the pulse generator produces an output signal in the form of a train of square wave pulses whose spacing is dependent upon the speed of rotation of the wheel. The train of square wave pulses produced by the pulse generator is applied to a frequency to voltage converter which produces an output voltage proportional to the speed of rotation of the wheel 23. The voltage level at the output of the frequency to voltage converter is sensed by a voltage level switch, conveniently a Schmitt trigger arrangement, the output of which is amplified and used to control the electrical switch in series with the manually operable switch and the control winding of the heavy current relay. The pedalling speed at which switching occurs is set by the voltage at which the voltage level switch is operated.

It will be recognised therefore that although the rider may hold the manually operable switch closed the electric motor will not be energised until the wheel 23 is being rotated at a speed in excess of a predetermined speed. Thus not only can the motor not be used to propel the cycle from rest it can also not be used as the sole propulsion means of the cycle since if the rider ceases to pedal then the wheel 23 will cease to rotate since it will not be driven from the rear wheels by virtue of the free wheel arrangement mentioned above. Thus when the rider ceases to pedal the chain wheel 23 will cease to rotate and the electronic control circuit will cause deenergisation of the motor since the speed of rotation of the wheel 23 will have dropped below the predetermined speed necessary to cause operation of the voltage level switch.

While the electronic control arrangement described above is described in conjunction with the tricycle it is to be understood that it can be used also on a bicycle having electric motor assistance. The nature of the drive train will of course be considerably simplified in a cycle since there is no necessity to provide a differential gear mechanism.

The electronic control arrangement described in general terms above, is the preferred arrangement although it is to be understood that other electronic control arrangements can be utilised to ensure that the rider must be pedalling the cycle at a predetermined speed before the motor is energised.

As will be recognised the normal pedalling action when a rider is propelling a cycle by pedalling involves momentary pauses as the pedals reach the top dead centre and the bottom dead centre positions respectively. The electronic control circuit includes a delay mechanism of known type incorporated in the frequency to voltage converter shown in FIG. 5 which ensures that the electric motor is not de-energised as a result of these momentary pauses. However, the delay affected by the delay mechanism is relatively short, and so the motor will be de-energised extremely rapidly upon the speed of rotation of the wheel 23 dropping below the predetermined value. Moreover it has been found that the operation of the electric motor can give rise to an interference signal in the electrical circuit of the cycle. The interference is known as "commutation interference" and the circuit is designed to discriminate against this interference so that it does not effect the intended operation of the system.

We claim:

1. An electrically assisted cycle including a frame rotatably supporting a ground engaging wheel, rider operable drive means mounted on the frame and mechanically coupled to said wheel whereby the rider can physically operate said drive means to propel the cycle, and electric motor and an associated power source carried by said frame, the output of said electric motor being coupled to said wheel whereby said motor can assist propulsion of the cycle, electrical switch means operable to energize said motor and sensing means for sensing the speed of rotation of said rider operable drivemeans and for causing operation of said switch means to energize said motor only when said drive means is operated by a rider in excess of a predetermined speed whereby in order to obtain electrical assistance in propelling the cycle the rider must rotate said drive means at a speed in excess of said predetermined speed.

2. A cycle as claimed in claim 1 wherein said rider operable drive means includes a pair of pedals connected to a chain wheel, rotation of the chain wheel being transmitted to said ground engaging wheel said sensing means having a delay mechanism whereby said switch means, when operative is not returned to its inoperative state immediately the speed of rotation of said drive means falls below said predetermined speed.

3. A cycle as claimed in claim 2 wherein the sensing means comprises means carried by the chain wheel of the drive means and a sensing head carried by the frame and positioned adjacent the path of movement of said means carried by the chain wheel.

4. A cycle as claimed in claim 3 wherein the chain wheel carries a plurality of equi-angularly spaced permanent magnets disposed in a circular row having its centre on the axis of rotation of the chain wheel and said sensing head is arranged to produce output signals resulting from the passage adjacent the head of the magnets, said signals being utilised for operating said switch means.

* * * * *